United States Patent
Xia (10) Patent No.: US 8,656,171 B2
(45) Date of Patent: Feb. 18, 2014

(54) METHOD, APPARATUS, AND SYSTEM FOR CONFIGURING KEY

(75) Inventor: Zhongqi Xia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 475 days.

(21) Appl. No.: 12/846,455

(22) Filed: Jul. 29, 2010

(65) Prior Publication Data

US 2010/0299524 A1 Nov. 25, 2010

Related U.S. Application Data

(63) Continuation of application No. PCT/CN2009/070281, filed on Jan. 22, 2009.

(30) Foreign Application Priority Data

Jan. 31, 2008 (CN) .......................... 2008 1 0006803

(51) Int. Cl.
*H04L 29/06* (2006.01)
(52) U.S. Cl.
USPC ............... 713/171; 713/155; 713/168; 726/3; 709/218; 709/223; 709/227
(58) Field of Classification Search
None
See application file for complete search history.

(56) References Cited

U.S. PATENT DOCUMENTS

| | | | | |
|---|---|---|---|---|
| 7,475,241 B2 * | 1/2009 | Patel et al. | .................... | 713/155 |
| 7,561,692 B2 * | 7/2009 | Altshuller et al. | ............ | 380/247 |
| 7,596,225 B2 * | 9/2009 | Mizikovsky et al. | ......... | 380/273 |
| 7,602,918 B2 * | 10/2009 | Mizikovsky et al. | ......... | 380/270 |
| 7,882,346 B2 * | 2/2011 | O'Neill et al. | ................ | 713/153 |
| 8,037,305 B2 * | 10/2011 | Rahman et al. | ............... | 713/168 |
| 8,099,597 B2 * | 1/2012 | Nakhjiri | ........................ | 713/169 |
| 2003/0147537 A1 | 8/2003 | Jing et al. | | |
| 2008/0072047 A1 * | 3/2008 | Sarikaya et al. | ............. | 713/171 |
| 2009/0043901 A1 * | 2/2009 | Mizikovsky et al. | ......... | 709/229 |

FOREIGN PATENT DOCUMENTS

| | | |
|---|---|---|
| CN | 101079691 A | 11/2007 |
| WO | WO 2007148906 A1 | 12/2007 |

OTHER PUBLICATIONS

Chien, Hung-Yu; Lin, Ru-Yu. Identity-based Key Agreement Protocol for Mobile Ad-hoc Networks Using Bilinear Pairing. IEEE Conference on Sensor Networks, Ubiquitous, and Trustworthy Computing. Pub. Date: 2006. Found on the World Wide Web at: http://ieeexplore.ieee.org/stamp/stamp.jsp?tp=&arnumber=1636220.*
Written Opinion of the International Searching Authority issued in corresponding PCT Patent Application No. PCT/CN2009/070281, mailed May 14, 2009.

(Continued)

*Primary Examiner* — Cordelia Zecher
*Assistant Examiner* — Jeremiah Avery
(74) *Attorney, Agent, or Firm* — Brinks, Gilson & Lione (57) ABSTRACT

A method, an apparatus, and a system for configuring a key are provided. The method includes the following steps. A mobile node (MN) and an authentication authorization accounting home server (AAAH) generate a domain specific root key (DSRK) of a visited domain respectively. The AAAH sends the DSRK to an AAA visited server (AAAV). The MN and the AAAV generate a domain specific media independent handover service root key (DS-MIHS-RK) by using the DSRK respectively. The AAAV sends the DS-MIHS-RK to a visited domain media independent handover (MIH) authenticator. Thus, cumbersomeness and risks of errors in configuring and authenticating a password manually are avoided, so that large-scale and secure deployment of the MIH service becomes possible.

20 Claims, 7 Drawing Sheets

(56) References Cited

OTHER PUBLICATIONS

Communication issued in corresponding European Patent Application No. 09709512.9, mailed Apr. 19, 2011.
Dutta et al., "A Framework of Media-Independent Pre-Authentication (MPA) for Inter-domain Handover Optimization", MOBOPTS Research Group. Nov. 18, 2007.
Narayanan et al., "EAP Extensions for EAP Re-Authentication Protocol (ERP)", Network Working Group. Nov. 18, 2007.
"Draft IEEE Standard for Local and Metropolitan Area Networks: Media Independent Handover Services" IEEE Computer Society. Jan. 2006.
International Search Report issued in corresponding PCT Application No. PCT/CN2009/070281; mailed May 14, 2009.
Office Action issued in corresponding European Patent Application No. 09709512.9, mailed Jun. 1, 2012.

* cited by examiner

FIG. 7

METHOD, APPARATUS, AND SYSTEM FOR CONFIGURING KEY

CROSS-REFERENCE TO RELATED APPLICATIONS

This application is a continuation of International Application No. PCT/CN2009/070281, filed on Jan. 22, 2009, which claims priority to Chinese Patent Application No. 200810006803.2, filed on Jan. 31, 2008, both of which are hereby incorporated by reference in their entireties.

FIELD OF THE TECHNOLOGY

The present disclosure relates to the field of mobile communications technologies, and more particularly to a method, an apparatus, and a system for configuring a key.

BACKGROUND

Figure 1:
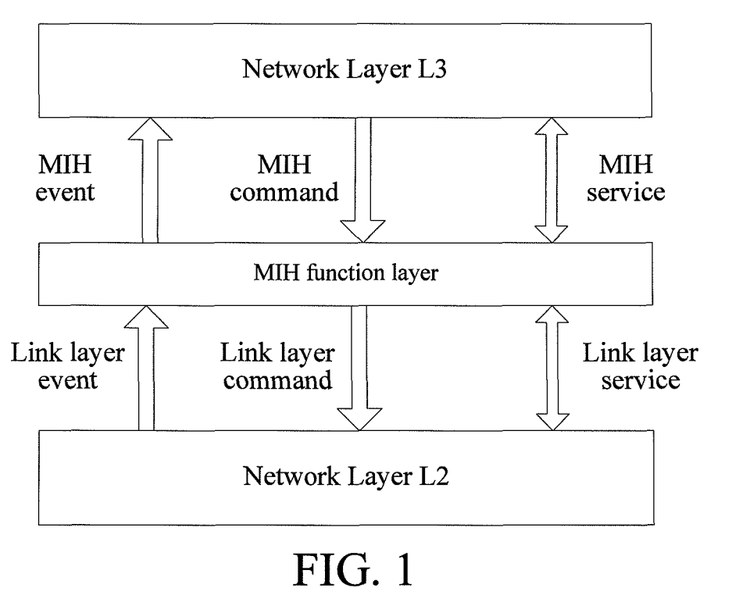
FIG. 1 is an architecture view of hierarchy of an MIH network in the prior art.

Media independent handover (MIH) is a service frame used for assisting and optimizing mobile services in a heterogeneous network. A relation between the MIH service and other network hierarchical protocol is as shown in FIG. 1. In FIG. 1, the MIH service is located between Layer 3 (L3), i.e., a network layer in an International Organization for Standardization (ISO) model, and Layer 2 (L2), i.e., a data link layer in the ISO model. The MIH provides service support for mobility protocols, such as the Mobile Internet Protocol (MIP) and the Session Initiation Protocol (SIP), above the Layer L3. At the same time, the MIH needs to use services at Layer 2 and layers below Layer 2. The MIH can provide three types of services, which are an MIH event service (ES), an MIH command service (CS), and an MIH information service (IS), respectively. The MIH ES provides a real-time transmission service of events below a link layer or in a remote link. The MIH CS provides a command transmission service that changes a status or a connection point of a bottom layer link. The MIH IS provides an information transmission service of network topology and position-related information.

The MIH service may be used between a mobile node (MN) and network infrastructure, or between the network infrastructure and a network node. Generally, when roaming to a foreign network, the MN can only access a visited network domain through interactions between an access authentication system of a visited domain and an access authentication system of a home domain. In order to accomplish rapid handover, the MN needs to access a visited domain MIH service entity, which results in a problem of how to ensure security of information between the MN and a visited domain MIH authenticator.

Currently, an authentication password is usually configured on the MN and the visited domain MIH authenticator in a manual mode, so as to ensure security of information between the MN and the visited domain MIH authenticator. However, the primitive mode of manually configuring the authentication password is cumbersome and easily results in errors, so that the extension and deployment of the MIH service is adversely affected.

SUMMARY

Accordingly, the present disclosure is directed to a method, an apparatus, and a system for configuring a key, so as to solve a problem of cumbersomeness and unreliability in an existing solution of manually configuring an authentication password.

Thus, in the embodiments, the present disclosure provides the following technical solutions.

The present disclosure provides a method for configuring a key, which includes the following steps. A mobile node (MN) and an authentication authorization accounting (AAA) home server (AAAH) generate a visited domain specific root key (DSRK) respectively. The AAAH sends the DSRK to an AAA server in a visited domain (AAAV). The MN and the AAAV generate a domain specific media independent handover service root key (DS-MIHS-RK) by using the DSRK respectively. The AAAV sends the DS-MIHS-RK to a visited domain media independent handover (MIH) authenticator.

The present disclosure provides an apparatus for configuring a key. The apparatus is located at an MN side and configured to configure a key for the MN. The key is between the MN and a visited domain MIH authenticator. The apparatus includes a DSRK generating unit and a DS-MIHS-RK generating unit. The DSRK generating unit is configured to compute a DSRK by using a pre-computed extensible master session key (EMSK), a pre-obtained visited domain identifier (ID), a pre-obtained AAAV ID, and a cookie. The DS-MIHS-RK generating unit is configured to compute a DS-MIHS-RK by using the DSRK, a pre-obtained MIH ID, a pre-obtained MN ID, and a cookie.

The present disclosure provides an apparatus for configuring a key. The apparatus is located at a visited domain MIH authenticator side and configured to configure a key for a visited domain MIH authenticator. The key is between an MN and the visited domain MIH authenticator. The apparatus includes a DS-MIHS-RK receiving unit, configured to receive a DS-MIHS-RK from an AAAV.

The present disclosure provides an apparatus for configuring a key. The apparatus is located at an AAAH side and includes a DSRK generating unit and a DSRK sending unit. The DSRK generating unit is configured to compute a DSRK by using a pre-computed EMSK, a pre-obtained visited domain ID, a pre-obtained AAAV ID, and a cookie. The DSRK sending unit is configured to send the DSRK to an AAAV.

The present disclosure provides an apparatus for configuring a key. The apparatus is located at an AAAV side and includes a DSRK receiving unit and a DS-MIHS-RK generating unit. The DSRK receiving unit is configured to receive a DSRK from an AAAH. The DS-MIHS-RK generating unit is configured to compute a DS-MIHS-RK by using the DSRK, a pre-obtained MIH ID, a pre-obtained MN ID, and a cookie, and send the DS-MIHS-RK to a visited domain MIH authenticator.

The present disclosure provides a system for configuring a key, which includes an MN, an AAAH, an AAAV, and a visited domain MIH authenticator. The MN includes a DSRK generating unit and a DS-MIHS-RK generating unit. The DSRK generating unit is configured to compute a DSRK by using a pre-computed master key EMSK, a pre-obtained visited domain ID, a pre-obtained AAAV ID, and a cookie. The DS-MIHS-RK generating unit is configured to compute a DS-MIHS-RK by using the DSRK, a pre-obtained MIH ID, a pre-obtained MN ID, and a cookie. The AAAH includes a DSRK generating unit and a DSRK sending unit. The DSRK generating unit is configured to compute a DSRK by using a pre-computed master key EMSK, a pre-obtained visited domain ID, a pre-obtained AAAV ID, and a cookie. The DSRK sending unit is configured to send the DSRK generated by the DSRK generating unit to the AAAV. The AAAV includes a DSRK receiving unit and a DS-MIHS-RK generating unit. The DSRK receiving unit is configured to receive a DSRK from the AAAH. The DS-MIHS-RK generating unit is configured to compute a DS-MIHS-RK by using the DSRK received by the DSRK receiving unit, a pre-obtained MIH ID, a pre-obtained MN ID, and a cookie, and send the DS-MIHS-RK to the MIH authenticator. The visited domain MIH authenticator includes a DS-MIHS-RK receiving unit, configured to receive the DS-MIHS-RK from the AAAV.

It can be seen from the above description that, in the embodiments of the present disclosure, through dynamic establishment of authentication material and security association key material between the MN and the MIH authenticator, security of information between the MN and the MIH authenticator is ensured, so that cumbersomeness and risks of errors in manually configuring an authentication password are avoided and also large-scale secure deployment of the MIH service becomes possible. In addition, as the key material is established during authentication when the MN accesses the visited domain network, subsequent dynamic negotiation time is greatly shortened.

DETAILED DESCRIPTION OF THE EMBODIMENTS

In the embodiments of the present disclosure, a hierarchical key technology (hokey) is applied to configure a key between a mobile node (MN) and a visited domain media independent handover (MIH) authenticator, so as to ensure security of information between the MN and the MIH authenticator. It should be noted that in the embodiments of the present disclosure, the configuration of the key includes generation of a key and distribution of the key. The embodiments of the present disclosure are illustrated in detail in the following with reference to the accompanying drawings.

Figure 2:
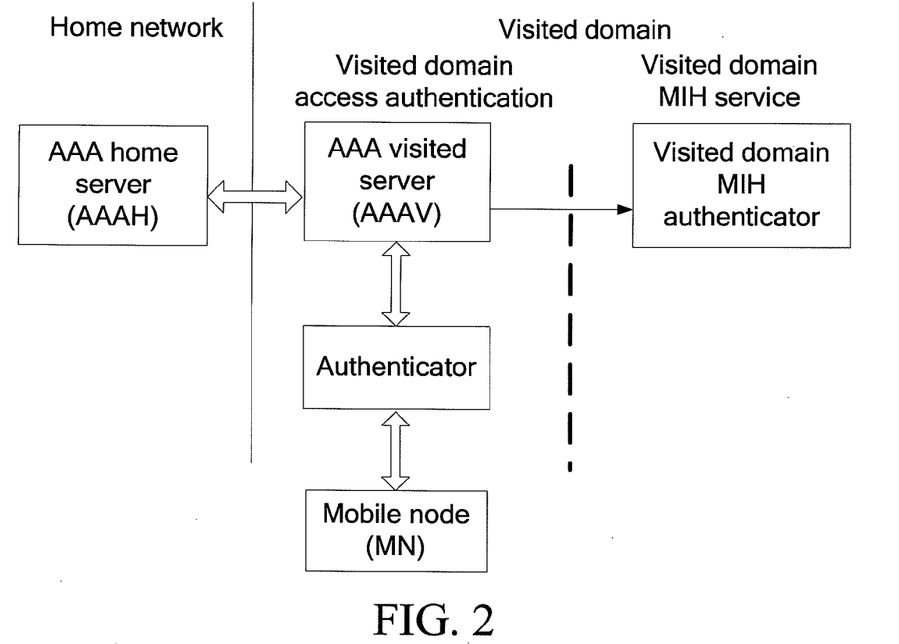
FIG. 2 is a schematic view of MIH service deployment.

FIG. 2 shows a basic scenario of MIH service deployment. In FIG. 2, an authentication authorization accounting home server (AAAH) represents an AAA server in a home domain and an AAAV represents an AAA server in a visited domain. In this embodiment, trustworthy secure channels are already established between the AAAH and the AAAV, between the AAAV and a visited domain MIH authenticator, and between the AAAV and a visited domain authenticator by default.

In a process that the MN moves in an external network, the MN may cross different network management domains (different AAA servers) or cross different network authenticators (different authenticators but under the same AAA server). Generally speaking, access authentication time of the network is long. For time delay sensitive services, time delay caused by movement, handover, and re-authentication of the MN might greatly decrease perception of time delay sensitive services by a user.

Currently, two main solutions exist for optimizing handover authentication of the MN. One solution is pre-authentication solution and the other solution is re-authentication solution. In the pre-authentication solution, authentication is finished before the MN handover, security-related key material is generated, and after the MN handover, the related key material is directly adopted to access the network. In the re-authentication solution, the authentication is finished after the MN handover.

Figure 3:
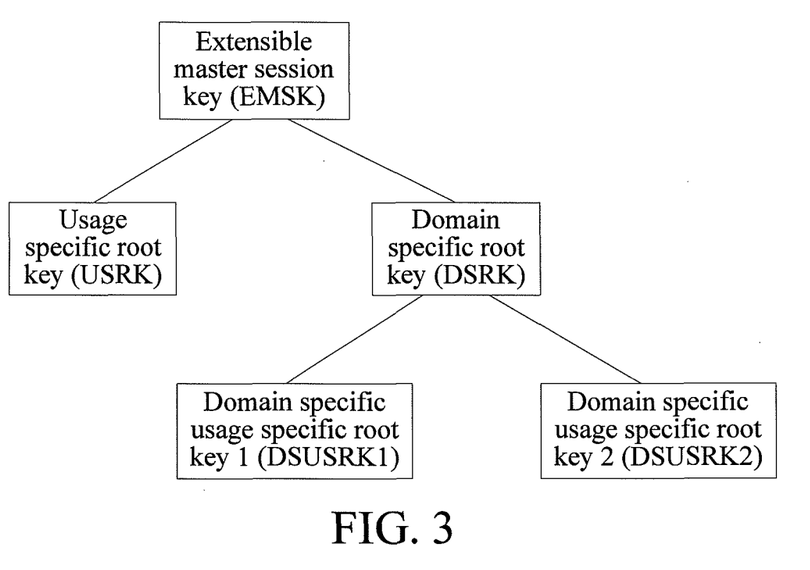
FIG. 3 is a schematic view of hierarchical key relations.

A hierarchical key technology is required in both the pre-authentication and re-authentication solutions. Relations in the hierarchical key technology are as shown in FIG. 3. In FIG. 3, an extensible master session key (EMSK) is a key derived by using an Extensible Authentication Protocol (EAP) method, a usage specific root key (USRK) and a domain specific root key (DSRK) are sub-keys derived from the EMSK, and a domain specific USRK (DSUSRK) is a sub-key derived from the DSRK.

A method for deriving the USRK and the DSRK from the EMSK is described in the following.

USRK=KDF (EMSK, Usage label, optional data, length)

DSRK=KDF (EMSK, Domain label, optional data, length)

A method for deriving the DSUSRK from the DSRK is described in the following.

DSUSRK=KDF (DSRK, Usage label, optional data, length)

In the method described in the foregoing, the KDF means a key derivation function. A common key derivation function includes hash-based message authentication code (HMAC)-secure hash algorithm (SHA)-256 and HMAC-message digest algorithm 5 (MD5). The Usage label and the Domain label mainly mean readable and writable strings.

In addition, key names of the USRK, DSRK, and the DSUSRK can be further derived, and the specific method is described in the following.

USRK name=PRF (EAP session ID, usage label)

DSRK name=PRF (EAP session ID, Domain label)

DSUSRK name=PRF (DSRK name, usage label)

In the foregoing three equations, the PRF means a pseudo random function.

Figure 4:
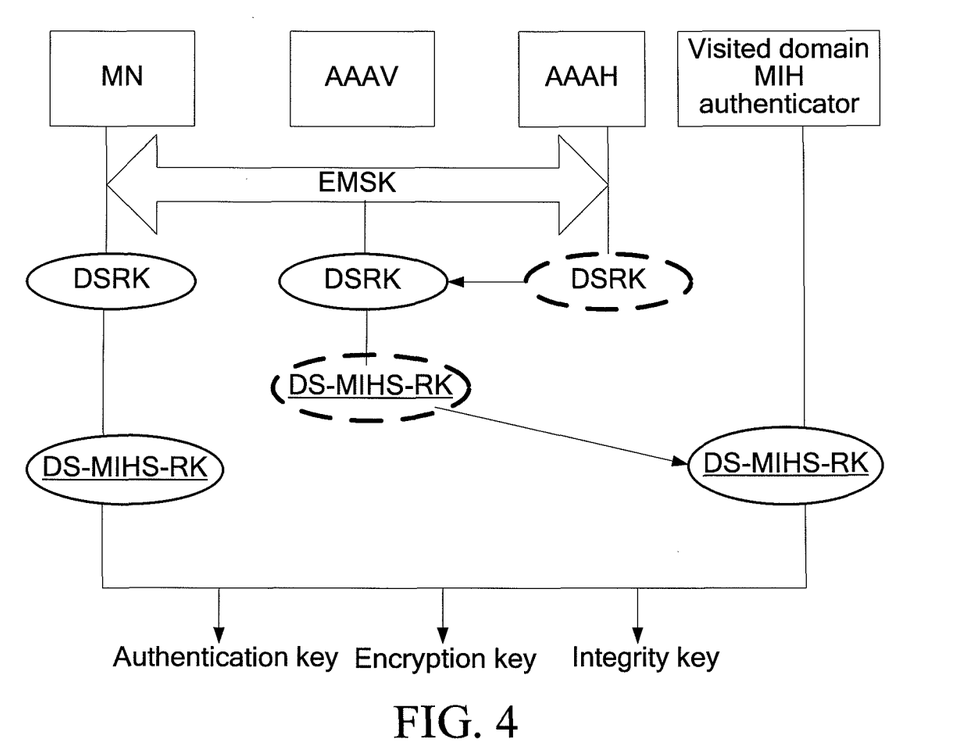
FIG. 4 is a schematic view of automatic derivation of an MIH service key according to an embodiment of the present disclosure.

FIG. 4 is a schematic view of automatic derivation of an MIH service key according to an embodiment of the present disclosure.

(1) Preparation Before Key Derivation

The MN obtains a visited domain identifier (ID) (referred to as a Domain ID hereinafter), a visited domain authenticator ID (referred to as an Authenticator ID hereinafter), and a visited domain MIH authenticator ID (referred to as an MIH ID hereinafter). The IDs are unique IDs for representing the objects, which can be specifically represented as an Internet Protocol (IP) address, a media access control (MAC) address, or a readable and writable string.

(2) Access by the MN to a Visited Network

The MN finishes access authentication with the AAAH through bridging of the AAAV by using an EAP authentication method. During the authentication, the AAAV obtains an MN ID and an MIH ID. The information is transferred to the AAAV by the MN by using a secure method. The AAAV notifies the AAAH of its own Domain ID and AAAV ID. During the access authentication, the MN also notifies the AAAH of the MN ID, the Authenticator ID, and the MIH ID.

(3) Generation of Master Session Key (MSK) and EMSK

The MN computes the MSK and the EMSK respectively by using the EAP method according to parameters such as the Domain ID, the Authenticator ID, and the MIH ID.

The AAAH computes the MSK and the EMSK respectively by using the EAP method according to parameters such as the Domain ID, the Authenticator ID, and the MIH ID.

(4) Establishment of Secure Channel Between MN and AAAH

The MN and the AAAH compute an integrity key (IK) and an encryption key (EK) according to parameters such as the EMSK and the MN ID. The specific generation method is described in the following.

$$IK=PRF(EMSK, \text{"Integrity key"}|MN\ ID|\text{optional data}) \quad \text{Formula 1}$$

$$EK=PRF(EMSK, \text{"Encryption key"}|MN\ ID|\text{optional data}) \quad \text{Formula 2}$$

The "optional data" represents a cookie.

By generating the IK and the EK, a secure channel for communication is established between the AAAH and the MN. The MN and the AAAH can use the IK and the EK to protect data content of the communication. After the secure channel is established, the AAAH sends the AAAV ID to the MN through the secure channel.

(5) Generation and Transmission of DSRK

The MN and the AAAH compute a visited DSRK according to parameters such as the EMSK, the Domain ID, and the AAAV ID. The AAAH transfers the DSRK to the AAAV. A method for deriving the DSRK is described in the following.

$$DSRK=PRF(EMSK, \text{Domain ID}|AAAV\ ID|\text{optional data}) \quad \text{Formula 3}$$

(6) Generation and Transmission of Domain Specific Media Independent Handover Service Root Key (DS-MIHS-RK)

The MN and AAAV compute the DS-MIHS-RK according to parameters such as the MN ID, the MIH ID, and the DSRK. The AAAV transfers the DS-MIHS-RK to a visited domain MIH authenticator. A method for deriving the DS-MIHS-RK is described in the following.

$$DS\text{-}MIHS\text{-}RK=PRF(DSRK, MIH\ ID|MN\ ID|\text{optional data}) \quad \text{Formula 4}$$

(7) Generation of Communication Key Material

The MN and the visited domain MIH authenticator already have the shared key material DS-MIHS-RK. The two parties can extract information related to the DS-MIHS-RK to generate a key for communication between the MN and the visited domain MIH authenticator according to agreement, for example, an authentication key (Key-auth), an encryption key (Key-enc) and an integrity key (Key-integrity) of the data channel.

$$\text{Key-auth}=Extract(DS\text{-}MIHS\text{-}RK, \text{Position-auth}) \quad \text{Formula 5}$$

$$\text{Key-enc}=Extract(DS\text{-}MIHS\text{-}RK, \text{Position-Encryption}) \quad \text{Formula 6}$$

$$\text{Key-integrity}=Extract(DS\text{-}MIHS\text{-}RK, \text{Position-integrity}) \quad \text{Formula 7}$$

The Extract represents an extraction function. The Position indicates a key extraction position.

The generation of the authentication key provides the key material for establishing the security association between the MN and the visited domain MIH authenticator. Definitely, the key for the communication between the MN and the visited domain MIH authenticator is not limited to the foregoing three types. Persons of ordinary skill in the art can understand that according to practical application situations, other keys for communication between the MN and the visited domain MIH authenticator can be generated by using the DS-MIHS-RK, and the description is omitted here.

Figure 5:
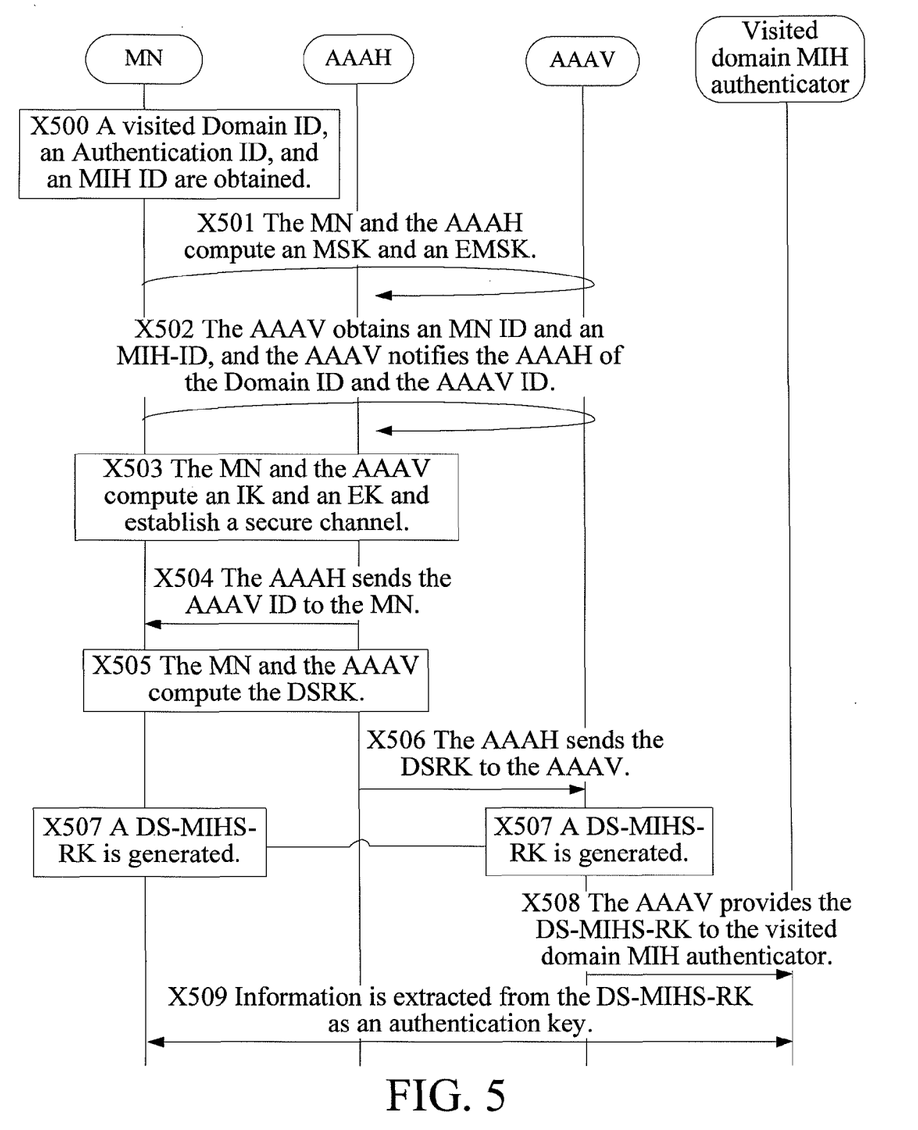
FIG. 5 is a flow chart of a method according to an embodiment of the present disclosure.

FIG. 5 is a flow chart of a method according to an embodiment of the present disclosure. The method includes the following steps.

In step X500, an MN obtains a Domain ID, an Authenticator ID, and an MIH ID.

In step X501, the MN performs access authentication with an AAAH through an AAAV. During the authentication, the AAAV obtains an MN ID and the MIH ID, the AAAH obtains the MN ID, the Authenticator ID, and the MIH ID, and also the AAAV notifies the AAAH of the Domain ID and an AAAV ID.

In step X502, the MN and the AAAH compute a MSK and an EMSK by using an EAP method according to parameters such as the Domain ID, the Authenticator ID, and the MIH ID.

In step X503, the MN and the AAAH compute an IK and an EK according to parameters such as the EMSK and the MN ID (referring to Formulae 1 and 2), so as to establish a secure channel between the MN and the AAAH.

In step X504, the AAAH sends the AAAV ID to the MN through the secure channel establish in step X503.

In step X505, the MN and the AAAH compute a visited DSRK according to parameters such as the EMSK, the Domain ID, and the AAAV ID (referring to Formula 3).

In step X506, the AAAH sends the DSRK to the AAAV.

In step X507, the MN and the AAAV compute a visited domain MIH service root key (DS-MIHS-RK) by using parameters such as the DSRK, the MIH ID, and the MN ID (referring to Formula 4).

In step X508, the AAAV sends the DS-MIHS-RK to a visited domain MIH authenticator.

In step X509, the MN and the visited domain MIH authenticator extract related information from the DS-MIHS-RK to generate a key for communication according to agreement.

Through the embodiment of the present disclosure, the authentication material and security association key material between the MN and the visited domain MIH authenticator can be dynamically established, so as to ensure security of information between the MN and the visited domain MIH authenticator, so that cumbersomeness and risks of errors in manually configuring the authentication password are avoided and also large-scale secure deployment of the MIH service becomes possible. As the key material is established during authentication when the MN accesses the visited domain network, subsequent dynamic negotiation time is greatly shortened.

In the embodiments, the present disclosure further provides various apparatuses for configuring a key between an MN and a visited domain MIH authenticator, including an apparatus located at an MN side, an apparatus located at a visited domain MIH authenticator side, an apparatus located at an AAAH side, and an apparatus located at an AAAV side.

Figure 6:
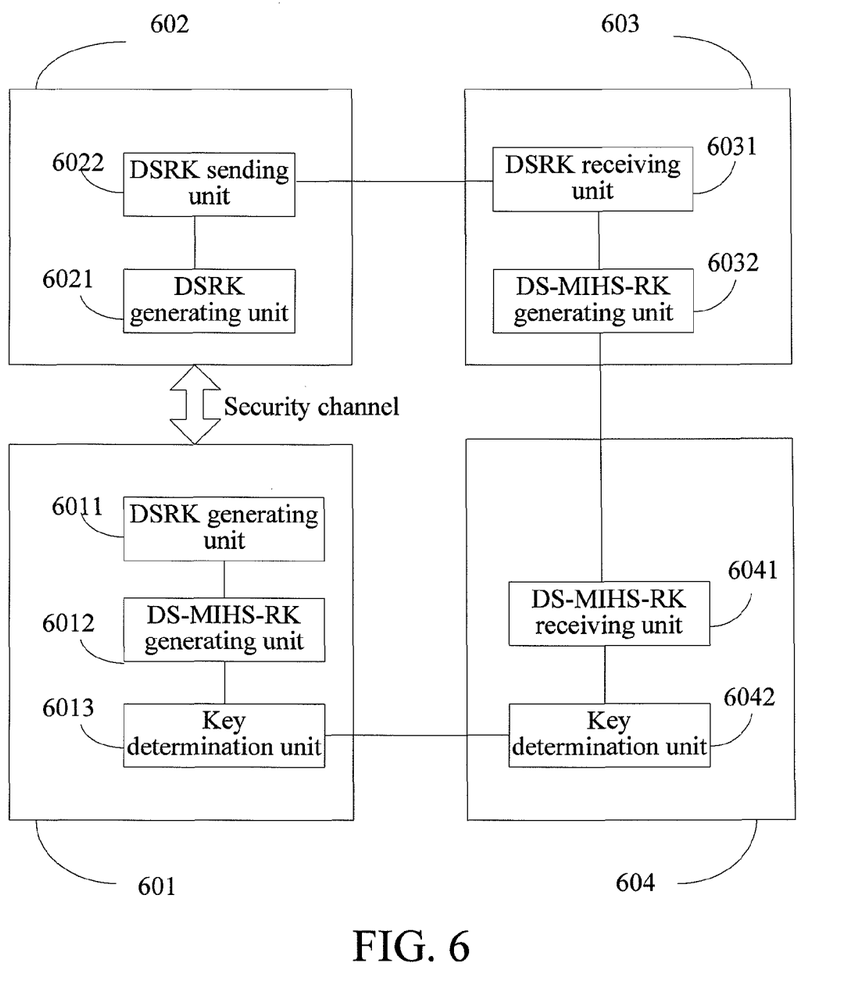
FIG. 6 is a schematic view 1 of internal structural relations of all apparatuses according to the present disclosure.

FIG. 6 is a schematic view of internal structural relations of all apparatuses.

An apparatus 601 located at an MN side includes a DSRK generating unit 6011 and a DS-MIHS-RK generating unit 6012.

The DSRK generating unit 6011 is configured to compute a DSRK by using a pre-computed EMSK, a pre-obtained Domain ID, a pre-obtained AAAV ID, and a cookie.

The DS-MIHS-RK generating unit 6012 is configured to compute a DS-MIHS-RK by using the DSRK, a pre-obtained MIH ID, a pre-obtained MN ID, and a cookie.

Figure 7:
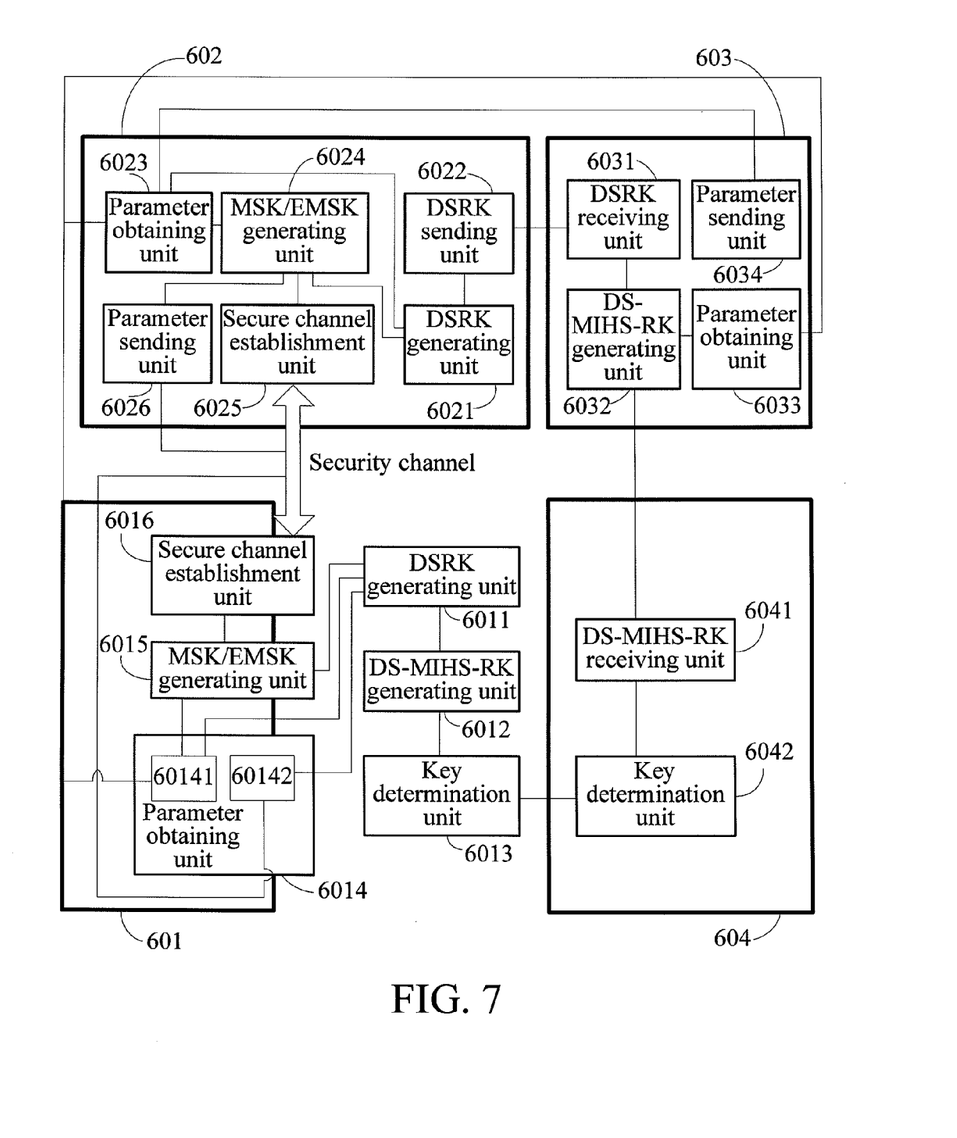
FIG. 7 is a schematic view 2 of internal structural relations of all apparatuses according to the present disclosure.

Optionally, referring to FIG. 7, the configuration apparatus 601 located at the MN side further includes a key determination unit 6013, a parameter obtaining unit 6014, an MSK/EMSK generating unit 6015, and a secure channel establishment unit 6016.

The key determination unit 6013 is configured to extract information from the DS-MIHS-RK to generate a key for communication between the MN and the visited domain MIH authenticator according to agreement with the visited domain MIH authenticator. The specific key for communication can include various types, such as an authentication key, an EK or an IK. In specific applications, data can be encrypted by using multiple keys for communication at the same time.

The parameter obtaining unit 6014 is configured to obtain parameters required for generating related keys, and includes a first parameter obtaining sub-unit 60141 and a second parameter obtaining sub-unit 60142.

The first parameter obtaining sub-unit 60141 is configured to obtain a Domain ID, an authenticator ID, and an MIH ID.

The second parameter obtaining sub-unit 60142 is configured to receive the AAAV ID from the AAAH through the secure channel established between the AAAH and the MN.

The MSK/EMSK generating unit 6015 is configured to generate the MSK and the EMSK by using the Domain ID, the authenticator ID, and the MIH ID obtained by the first parameter obtaining sub-unit 60141.

The secure channel establishment unit 6016 is configured to generate the IK and the EK by using the MN ID and the EMSK generated by the MSK/EMSK generating unit 6015, so as to establish a secure channel between the AAAH and the MN.

The configuration apparatus 601 located at the MN side may be independent equipment, and may also be integrated on other equipment, for example, integrated on the MN.

An apparatus 602 located at an AAAH side includes a DSRK generating unit 6021 and a DSRK sending unit 6022.

The DSRK generating unit 6021 is configured to compute a DSRK by using a pre-computed EMSK, a pre-obtained Domain ID, a pre-obtained AAAV ID, and a cookie.

The DSRK sending unit 6022 is configured to send the DSRK to an AAAV.

Referring to FIG. 7, the apparatus 602 located at the AAAH side further includes a parameter obtaining unit 6023, a MSK/EMSK generating unit 6024, a secure channel establishment unit 6025, and a parameter sending unit 6026.

The parameter obtaining unit 6023 is configured to obtain a Domain ID and an AAAV ID from the AAAV and obtain the MN ID, the authenticator ID, and the MIH ID from the MN when the MN performs access authentication with the AAAH through the AAAV.

The MSK/EMSK generating unit 6024 is configured to generate the MSK and the EMSK by using the Domain ID obtained from the AAAV and the authenticator ID and MIH ID obtained from the MN.

The secure channel establishment unit 6025 is configured to generate the IK and the EK by using the MN ID and the EMSK generated by the MSK/EMSK generating unit 6024 and establish a secure channel between the AAAH and the MN.

The parameter sending unit 6026 is configured to send the obtained AAAV ID to the MN through the secure channel established between the AAAH and the MN.

The apparatus 602 located at the AAAH side may be independent equipment or may also be integrated on other equipment, for example, integrated on the AAAH.

An apparatus 603 located at an AAAV side includes a DSRK receiving unit 6031 and a DS-MIHS-RK generating unit 6032.

The DSRK receiving unit 6031 is configured to receive a DSRK from an AAAH.

The DS-MIHS-RK generating unit 6032 is configured to compute a DS-MIHS-RK by using the DSRK, a pre-obtained MIH ID, a pre-obtained MN ID, and a cookie, and send the DS-MIHS-RK to a visited domain MIH authenticator.

Referring to FIG. 7, the intermediate apparatus 603 located at the AAAV side further includes a parameter obtaining unit 6033 and a parameter sending unit 6034.

The parameter obtaining unit 6033 is configured to obtain an MIH ID and an MN ID when the MN performs access authentication with the AAAH through the AAAV.

The parameter sending unit 6034 is configured to send the Domain ID and the AAAV ID to the AAAH when the MN performs the access authentication with the AAAH through the AAAV.

The intermediate apparatus 603 located at the AAAV side may be independent equipment, and may also be integrated on other equipment, for example, integrated on the AAAV.

An apparatus 604 located at a visited domain MIH authenticator side includes a DS-MIHS-RK receiving unit 6041 and a key determination unit 6042.

The DS-MIHS-RK receiving unit 6041 is configured to receive a DS-MIHS-RK from an AAAV.

The key determination unit 6042 is configured to extract information from the DS-MIHS-RK to generate a key for communication between the MN and an MIH authenticator according to agreement with the MN. Specifically, the key for communication can include various types, such as an authentication key, an EK or IK. In specific applications, data can be encrypted by using multiple keys for communication at the same time.

The configuration apparatus 604 located at the visited domain MIH authenticator side may be independent equipment, and may also be integrated on other equipment, for example, integrated on the visited domain MIH authenticator.

Through the embodiments of the present disclosure, authentication material and security association key material between the MN and the visited domain MIH authenticator can be dynamically established, so as to ensure security of information between the MN and the visited domain MIH authenticator, so that cumbersomeness and risks of errors in manually configuring the authentication password are avoided and large-scale secure deployment of the MIH service becomes possible. As the key material is established during authentication when the MN accesses the visited domain network, subsequent dynamic negotiation time is greatly shortened.

In an embodiment, the present disclosure further provides a system for configuring a key. The system includes an MN, an AAAH, an AAAV, and a visited domain MIH authenticator.

Still referring to FIG. 6, the MN includes a DSRK generating unit 6011 and a DS-MIHS-RK generating unit 6012. The DSRK generating unit 6011 is configured to compute a DSRK by using a pre-computed EMSK, a pre-obtained visited domain ID, a pre-obtained AAAV ID, and a cookie. The DS-MIHS-RK generating unit 6012 is configured to compute a DS-MIHS-RK by using the DSRK, a pre-obtained MIH ID, a pre-obtained MN ID, and a cookie.

The AAAH includes a DSRK generating unit 6021 and a DSRK sending unit 6022. The DSRK generating unit 6021 is configured to compute a DSRK by using a pre-computed EMSK, a pre-obtained visited domain ID, a pre-obtained AAAV ID, and a cookie. The DSRK sending unit 6022 is configured to send the DSRK to the AAAV.

The AAAV includes a DSRK receiving unit 6031 and a DS-MIHS-RK generating unit 6032. The DSRK receiving unit 6031 is configured to receive the DSRK from the AAAH. The DS-MIHS-RK generating unit 6032 is configured to compute a DS-MIHS-RK by using the DSRK, the pre-obtained MIH ID, the pre-obtained MN ID and a cookie, and send the DS-MIHS-RK to a visited domain MIH authenticator.

The visited domain MIH authenticator includes a DS-MIHS-RK receiving unit 6041, configured to receive the DS-MIHS-RK form the AAAV.

Referring to FIG. 7, the MN further includes a key determination unit 6013, a parameter obtaining unit 6014, an MSK/EMSK generating unit 6015, and a secure channel establishment unit 6016.

The key determination unit 6013 is configured to extract information from the DS-MIHS-RK to generate a key for communication between the MN and the visited domain MIH authenticator according to agreement with the visited domain MIH authenticator.

The parameter obtaining unit 6014 is configured to obtain parameters required for generating related keys.

The MSK/EMSK generating unit 6015 is configured to generate the MSK and the EMSK by using the visited domain ID, the Authenticator ID, and the MIH ID obtained by the first parameter obtaining sub-unit 60141.

The secure channel establishment unit 6016 is configured to generate the IK and the EK by using the EMSK and the MN ID generated by the MSK/EMSK generating unit 6015, and establish a secure channel between the AAAH and the MN.

The AAAH further includes a parameter obtaining unit 6023, an MSK/EMSK generating unit 6024, a secure channel establishment unit 6025, and a parameter sending unit 6026.

The parameter obtaining unit 6023 is configured to obtain the visited domain ID and AAAV ID from the AAAV and obtain the MN ID, the authenticator ID, and the MIH ID from the MN when the MN performs access authentication with the AAAH through the AAAV.

The MSK/EMSK generating unit 6024 is configured to generate the MSK and the EMSK by using the obtained visited domain ID, the Authenticator ID, and the MIH ID.

The secure channel establishment unit 6025 is configured to generate the IK and the EK by using the MN ID and the EMSK generated by the MSK/EMSK generating unit 6024, and establish a secure channel between the AAAH and the MN.

The parameter sending unit 6026 is configured to send the obtained AAAV ID to the MN through the secure channel established between the AAAH and the MN.

The AAAV further includes a parameter obtaining unit 6033 and a parameter sending unit 6034.

The parameter obtaining unit 6033 is configured to obtain the MIH ID and the MN ID when the MN performs the access authentication with the AAAH through the AAAV.

The parameter sending unit 6034 is configured to send the visited domain ID and the AAAV ID to the AAAV when the MN performs the access authentication with the AAAH through the AAAV.

The visited domain MIH authenticator further includes a key determination unit 6042.

The key determination unit 6042 is configured to extract information from the DS-MIHS-RK to generate a key for communication between the MN and the visited domain MIH authenticator according to agreement with the MN.

Specific implementation details of each of the apparatuses and systems provided in the embodiments of the present disclosure can be referred to the method embodiments, and the description is omitted here.

It should be noted that the above descriptions are merely some exemplary embodiments of the present disclosure, and person having ordinary skill in the art may make various improvements and refinements without departing from the scope of the disclosure. All such modifications and refinements are intended to be covered by the present disclosure.

What is claimed is:

1. A method for configuring a key, comprising:
generating, by a mobile node (MN) and an authentication authorization accounting home server (AAAH), a visited domain specific root key (DSRK) respectively;
sending, by the authentication authorization accounting home server (AAAH), the visited domain specific root key (DSRK) to an authentication authorization accounting server in a visited domain (AAAV);
generating, by the mobile node (MN) and the authentication authorization accounting server in the visited domain (AAAV), a domain specific media independent handover service root key (DS-MIHS-RK) by using the visited domain specific root key (DSRK) respectively; and
sending, by the authentication authorization accounting server in the visited domain (AAAV), the DS-MIHS-RK to a visited domain media independent handover (MIH) authenticator.

2. The method according to claim 1, wherein the generating, by the mobile node (MN) and the authentication authorization accounting home server (AAAH), the visited domain specific root key (DSRK) respectively comprises:
computing, by the mobile node (MN) and authentication authorization accounting home server (AAAH), the visited domain specific root key (DSRK) by using an extensible master session key (EMSK), a visited domain identifier (ID), an AAAV ID, and a cookie respectively.

3. The method according to claim 2, wherein the generating, by the mobile node (MN) and the authentication authorization accounting home server (AAAH), the domain specific root key (DSRK) respectively further comprises:
pre-obtaining, by the mobile node (MN), the visited domain ID, a visited domain authenticator ID, and a visited domain MIH ID;
performing, by the mobile node (MN), access authentication with the authentication authorization accounting home server (AAAH) through the authentication authorization accounting server in the visited domain (AAAV);
obtaining, by the authentication authorization accounting home server (AAAH), the visited domain ID, an Authenticator ID, the MIH ID, the AAAV ID, and an MN ID;
generating, by the mobile node (MN) and the authentication authorization accounting home server (AAAH), the extensible master session key (EMSK) by using the visited domain ID, the Authenticator ID, and the MIH ID;
establishing a secure channel between the mobile node (MN) and the authentication authorization accounting home server (AAAH); and
sending, by the authentication authorization accounting home server (AAAH), the AAAV ID to the mobile node (MN) through the secure channel.

4. The method according to claim 3, wherein the establishing the secure channel between the mobile node (MN) and the authentication authorization accounting home server (AAAH) comprises: generating an integrity key (IK) and an encryption key (EK) by using the extensible master session key (EMSK), the MN ID, and a cookie, and establishing the secure channel between the mobile node (MN) and the authentication authorization accounting home server (AAAH).

5. The method according to claim 1, wherein the generating, by the mobile node (MN) and the authentication authorization accounting server in the visited domain (AAAV), the DS-MIHS-RK by using the domain specific root key (DSRK) respectively comprises:

computing, by the mobile node (MN) and authentication authorization accounting server in the visited domain (AAAV), the DS-MIHS-RK by using the domain specific root key (DSRK), a pre-obtained MIH ID, a pre-obtained MN ID, and a cookie respectively.

6. The method according to claim 5, wherein the generating, by the mobile node (MN) and authentication authorization accounting server in the visited domain (AAAV), the DS-MIHS-RK by using the domain specific root key (DSRK) respectively further comprises:

pre-obtaining, by the mobile node (MN), the visited domain ID and the MIH ID;

performing, by the mobile node (MN), the access authentication with the authentication authorization accounting home server (AAAH) through the authentication authorization accounting server in the visited domain (AAAV), and obtaining, by the authentication authorization accounting server in the visited domain (AAAV), the MIH ID and the MN ID; and sending, by the authentication authorization accounting home server (AAAH), the domain specific root key (DSRK) to the authentication authorization accounting server in the visited domain (AAAV), after generating the domain specific root key (DSRK).

7. The method according to claim 1, further comprising:
extracting, by the mobile node (MN) and the visited domain MIH authenticator, information from the DS-MIHS-RK according to an agreement to generate a key for communication between the mobile node (MN) and the visited domain MIH authenticator.

8. The method according to claim 7, wherein the key for communication between the mobile node (MN) and the visited domain MIH authenticator comprises: an authentication key, an EK or an IK of a data channel.

9. An apparatus for configuring a key, located at a mobile node (MN) side, and configured to configure a key for the mobile node (MN), wherein the key is between the mobile node (MN) and a visited domain media independent handover (MIH) authenticator, the apparatus comprising:

a domain specific root key (DSRK) generating unit, configured to compute a domain specific root key (DSRK) by using a pre-computed extensible master session key (EMSK), a pre-obtained visited domain identifier (ID), a pre-obtained authentication authorization accounting server in a visited domain (AAAV) ID, and a cookie; and a domain specific media independent handover service root key (DS-MIHS-RK) generating unit, configured to compute a domain specific media independent handover service root key (DS-MIHS-RK) by using the domain specific root key (DSRK), a pre-obtained MIH ID, a pre-obtained MN ID, and a cookie.

10. The apparatus according to claim 9, further comprising:

a key determination unit, configured to extract information from the DS-MIHS-RK to generate a key for communication between the mobile node (MN) and the visited domain MIH authenticator according to agreement with the visited domain MIH authenticator.

11. The apparatus according to claim 9, further comprising:

a parameter obtaining unit, configured to obtain parameters required for generating a master session key (MSK) and the extensible master session key (EMSK).

12. The apparatus according to claim 11, wherein the parameter obtaining unit comprises:

a first parameter obtaining sub-unit, configured to obtain the visited domain ID, an authenticator ID, and the MIH ID; and a second parameter obtaining sub-unit, configured to receive the AAAV ID from an authentication authorization accounting home server (AAAH) through a secure channel established between the authentication authorization accounting home server (AAAH) and the mobile node (MN).

13. The apparatus according to claim 12, further comprising:

an MSK/EMSK generating unit, configured to generate the MSK and the extensible master session key (EMSK) by using the visited domain ID, the authenticator ID, and the MIH ID obtained by the first parameter obtaining sub-unit; and a secure channel establishment unit, configured to generate an integrity key (IK) and an encryption key (EK) by using the MN ID and the extensible master session key (EMSK) generated by the MSK/EMSK generating unit, and establish the secure channel between the authentication authorization accounting home server (AAAH) and the mobile node (MN).

14. The apparatus according to claim 10, further comprising:

a parameter obtaining unit, configured to obtain parameters required for generating a master session key (MSK) and the extensible master session key (EMSK).

15. The apparatus according to claim 14, wherein the parameter obtaining unit comprises:

a first parameter obtaining sub-unit, configured to obtain the visited domain ID, an authenticator ID, and the MIH ID; and a second parameter obtaining sub-unit, configured to receive the AAAV ID from an authentication authorization accounting home server (AAAH) through a secure channel established between the authentication authorization accounting home server (AAAH) and the mobile node (MN).

16. The apparatus according to claim 15, further comprising:

an MSK/EMSK generating unit, configured to generate the MSK and the extensible master session key (EMSK) by using the visited domain ID, the authenticator ID, and the MIH ID obtained by the first parameter obtaining sub-unit; and a secure channel establishment unit, configured to generate an integrity key (IK) and an encryption key (EK) by using the MN ID and the extensible master session key (EMSK) generated by the MSK/EMSK generating unit, and establish the secure channel between the authentication authorization accounting home server (AAAH) and the mobile node (MN).

17. An apparatus for configuring a key, located at an authentication authorization accounting home server (AAAH) side, comprising:

a domain specific root key (DSRK) generating unit, configured to compute a domain specific root key (DSRK) by using a pre-computed extensible master session key (EMSK), a pre-obtained visited domain identifier (ID), a pre-obtained authentication authorization accounting server in a visited domain (AAAV) ID, and a cookie; and a DSRK sending unit, configured to send the domain specific root key (DSRK) to an authentication authorization accounting server in a visited domain (AAAV).

18. The apparatus according to claim 17, further comprising:
- a parameter obtaining unit, configured to obtain the visited domain ID and the AAAV ID from the authentication authorization accounting server in the visited domain (AAAV) and obtain a mobile node (MN) ID, an authenticator ID, and a media independent handover (MIH) ID from the mobile node (MN) when the mobile node (MN) performs access authentication with the authentication authorization accounting home server (AAAH) through the authentication authorization accounting server in the visited domain (AAAV).

19. The apparatus according to claim 18, further comprising:
- a master session key (MSK)/EMSK generating unit, configured to generate an MSK and the extensible master session key (EMSK) by using the obtained visited domain ID, authenticator ID, and MIH ID;
- a secure channel establishment unit, configured to generate an integrity key (IK) and an encryption key (EK) by using the MN ID and the extensible master session key (EMSK) generated by the MSK/EMSK generating unit, and establish a secure channel between the authentication authorization accounting home server (AAAH) and the mobile node (MN); and
- a parameter sending unit, configured to send the obtained AAAV ID to the mobile node (MN) through the secure channel established between the authentication authorization accounting home server (AAAH) and the mobile node (MN).

20. The apparatus according to claim 17, further comprising:
- a master session key (MSK)/EMSK generating unit, configured to generate an MSK and the extensible master session key (EMSK) by using the obtained visited domain ID, authenticator ID, and MIH ID;
- a secure channel establishment unit, configured to generate an integrity key (IK) and an encryption key (EK) by using the MN ID and the extensible master session key (EMSK) generated by the MSK/EMSK generating unit, and establish a secure channel between the authentication authorization accounting home server (AAAH) and the mobile node (MN); and
- a parameter sending unit, configured to send the obtained AAAV ID to the mobile node (MN) through the secure channel established between the authentication authorization accounting home server (AAAH) and the mobile node (MN).

* * * * *